(12) United States Patent
Yamashiro

(10) Patent No.: US 9,539,989 B2
(45) Date of Patent: Jan. 10, 2017

(54) TRAVEL SUPPORT APPARATUS AND TRAVEL SUPPORT SYSTEM

(75) Inventor: Takahisa Yamashiro, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 413 days.

(21) Appl. No.: 13/569,457

(22) Filed: Aug. 8, 2012

(65) Prior Publication Data

US 2013/0041567 A1    Feb. 14, 2013

(30) Foreign Application Priority Data

Aug. 10, 2011   (JP) .................................. 2011-175092

(51) Int. Cl.
| | | |
|---|---|---|
| *B60T 7/22* | (2006.01) | |
| *B60W 30/16* | (2012.01) | |
| *G08G 1/00* | (2006.01) | |
| *B60W 30/09* | (2012.01) | |
| *B60W 30/095* | (2012.01) | |

(52) U.S. Cl.
CPC .................. *B60T 7/22* (2013.01); *B60W 30/16* (2013.01); *G08G 1/22* (2013.01); *B60W 30/09* (2013.01); *B60W 30/0956* (2013.01); *B60W 2550/30* (2013.01); *B60W 2550/302* (2013.01); *B60W 2550/308* (2013.01); *B60W 2720/10* (2013.01)

(58) Field of Classification Search
CPC ............. B60T 7/22; B60W 30/16; G08G 1/22
USPC .................................................... 701/29.3, 96
See application file for complete search history.

(56) References Cited

U.S. PATENT DOCUMENTS

| | | | | |
|---|---|---|---|---|
| 5,295,551 | A | * | 3/1994 | Sukonick ................. B62D 1/28 180/167 |
| 6,128,559 | A | | 10/2000 | Saitou et al. |
| 2010/0256835 | A1 | * | 10/2010 | Mudalige ................. G08G 1/22 701/2 |
| 2013/0116861 | A1 | * | 5/2013 | Nemoto ........................... 701/2 |
| 2013/0144465 | A1 | * | 6/2013 | Shida ............................... 701/1 |

FOREIGN PATENT DOCUMENTS

| | | |
|---|---|---|
| JP | 5-170008 | 7/1993 |
| JP | H06-270780 | 9/1994 |
| JP | H10-293899 | 11/1998 |

(Continued)

OTHER PUBLICATIONS

Office Action issued May 7, 2014 in corresponding JP Application No. 2011-175092 (with English translation).

(Continued)

*Primary Examiner* — Basil T Jos
(74) *Attorney, Agent, or Firm* — Harness, Dickey & Pierce, P.L.C.

(57) ABSTRACT

A travel support system uses a wireless communication unit for receiving a following vehicle's speed control capacity, and compares the speed control capacity received with a speed control capacity of the subject vehicle. If the speed control capacity of the following vehicle is higher than the capacity of the subject vehicle, a maximum deceleration of the subject vehicle is restricted to a restricted value. In addition, a target inter-vehicle distance to a lead vehicle is set according to the restricted value of the subject vehicle, thereby enabling a reduction of the inter-vehicle distance to the lead vehicle for each of the vehicles in a convoy.

18 Claims, 3 Drawing Sheets

(56) References Cited

FOREIGN PATENT DOCUMENTS

| | | |
|---|---|---|
| JP | 2000-348300 | 12/2000 |
| JP | 2001-347850 | 12/2001 |
| JP | 2011-095833 | 5/2011 |

OTHER PUBLICATIONS

Office Action mailed Aug. 19, 2014 in the corresponding JP Application No. 2011-175092 with English translation.

\* cited by examiner

TRAVEL SUPPORT APPARATUS AND TRAVEL SUPPORT SYSTEM

CROSS REFERENCE TO RELATED APPLICATION

The present application is based on and claims the benefit of priority of Japanese Patent Application No. 2011-175092, filed on Aug. 10, 2011, the disclosure of which is incorporated herein by reference.

TECHNICAL FIELD

The present disclosure generally relates to a travel support apparatus and a travel support system including the travel support apparatus.

BACKGROUND

Conventionally, a technique for organizing a convoy travel of vehicles, or a platoon travel of vehicles, is known. The convoy travel of vehicle may include a lead vehicle and following vehicles, where a technique for organizing the convoy may control the travel of the following vehicles based on exchange of information through vehicle-to-vehicle wireless communication between terminals on the respective vehicles, for keeping a certain inter-vehicle distance interposed between vehicles. For example, Japanese Patent Laid-Open No. 2000-348300 (JP '300) discloses a convoy travel technique where each of the vehicles in the convoy transmits various information such as the subject vehicle position, amount of operations (e.g., operation amounts of a steering wheel, an accelerator, a brake and the like) and physical quantity (i.e., a vehicle speed, an acceleration, a yaw rate) to the following vehicles at regular intervals, and the following vehicles follow the respective lead vehicles according to received information.

In such convoy travel of the vehicles, the inter-vehicle distance between the vehicles may be reduced to accommodate more vehicles in one convoy, or may be reduced to increase the energy efficiency by the reduction of the travel resistance for each vehicle.

However, conventionally, it is difficult to reduce the inter-vehicle distance in the convoy travel of the vehicles, thereby making it difficult to achieve the advantageous effects of the convoy travel.

More specifically, since the brake capacity and the vehicle weight are different vehicle to vehicle, speed control capacity such as (i) a response time from a start of the braking to a start of speed reduction, (ii) deceleration magnitude designated as maximum deceleration and the like may be different for respective vehicle types. Further, whether the vehicle is equipped with an independent range sensor, which independently detects an inter-vehicle distance to a lead vehicle and whether the range sensor has detected an obstacle or not are closely related to and are substantially affecting the speed control capacity such as a "distance-based" response time or the like, which is detected as a response time for reducing the vehicle speed when a detected inter-vehicle distance is too short to the lead vehicle.

When a vehicle has a lower speed control capacity, such vehicle must have a longer inter-vehicle distance to the lead vehicle, because such vehicle takes a longer time to reduce its speed to a target value. Conventionally, for accommodating the lower speed control capacity vehicles, the convoy travel of the vehicles, used, for all the vehicles in the convoy, a target inter-vehicle distance of the lowest capacity vehicle. Therefore, depending on the vehicles, such target inter-vehicle distance is too long, and the advantages of the convoy travel of the vehicles were destroyed.

SUMMARY

In an aspect of the present disclosure, the travel support apparatus installed in a subject vehicle includes a communication unit, a first inter-vehicle, travel control unit, speed control capacity calculation unit, a comparison unit, and a maximum deceleration restriction unit.

The communication unit communicably couples the subject vehicle with surrounding vehicles in order to exchange information via vehicle-to-vehicle communication. Such information may include a speed control capacity of a vehicle transmitting the information.

The first inter-vehicle distance detection unit detects an inter-vehicle distance from the subject vehicle to a lead vehicle of the subject vehicle, and the travel control unit controls the inter-vehicle distance to the lead vehicle based on the information received by the communication unit from the lead vehicle. The speed control capacity calculation unit determines a speed control capacity of the subject vehicle, and the comparison unit compares the speed control capacity of the subject vehicle with the speed control capacity of a following vehicle of the subject vehicle when the communication unit receives the speed control capacity of the following vehicle.

The maximum deceleration restriction unit determines a restricted value of a maximum deceleration of the subject vehicle when the comparison unit determines that the following vehicle has a lower speed control capacity than the subject vehicle.

The following vehicle, which has a speed control capacity less than the subject vehicle, takes a longer time to reduce its speed to a target value than the subject vehicle. Therefore, even when the subject vehicle and the following vehicle determine, at the same time, an inter-vehicle distance between themselves and their respective lead vehicle to reduce their respective speeds, the following vehicle gradually approaches the subject vehicle if both vehicles reduce their speed at maximum deceleration. Thus, in such case, the following vehicle needs to have a longer inter-vehicle distance to its lead vehicle (i.e., the subject vehicle).

Therefore, if the speed control capacity of the following vehicle is lower than the subject vehicle, the maximum deceleration of the subject vehicle is restricted. Accordingly, the subject vehicle's response time for reducing its speed to the target value is made closer to the following vehicle's response time. In addition, the following vehicle is prevented from gradually approach the subject vehicle, or the degree of gradual approach of the following vehicle is made smaller, even when both vehicles start to brake/decelerate at the same time Therefore, the inter-vehicle distance of the following vehicle to its lead vehicle (i.e., subject vehicle) is made shorter. As a result, the inter-vehicle distance of each of the convoy vehicles is made shorter. The restriction of the maximum deceleration may not only refer to the restriction on the deceleration of full-braking but may also refer to the restriction of an upper limit of deceleration capacity of the vehicle.

In addition to the above, the apparatus may further include a target inter-vehicle distance determination unit for determining a target inter-vehicle distance to the lead vehicle. The target inter-vehicle distance to the lead vehicle has a reserved distance or a clearance that may absorb a change of the inter-vehicle distance as a result of a difference in the speed control capacity of the subject vehicle and the lead vehicle after the maximum deceleration of the subject vehicle is restricted by the maximum deceleration restriction unit. The target inter-vehicle distance is based on the restricted value of the maximum deceleration, the speed control capacity of the subject vehicle, and the speed control capacity of the lead vehicle. Further, the travel control unit controls the inter-vehicle distance between the subject vehicle and the lead vehicle to at least the target inter-vehicle distance.

When the maximum deceleration is restricted, such restriction leads to a longer response time to reduce the subject vehicle's speed to the target value, and, may reduce the speed control capacity of subject vehicle to below the speed control capacity of the lead vehicle and gradual decreases the inter-vehicle distance to the lead vehicle. Thus, the subject vehicle may need to have a longer inter-vehicle distance to the lead vehicle.

Therefore, even when the speed control capacity of the subject vehicle falls below the speed control capacity of the lead vehicle and a gradual decrease of the inter-vehicle distance to the lead vehicle is expected, the target inter-vehicle distance to the lead vehicle is controlled to have a reserved distance that can absorb a change of the inter-vehicle distance caused by a difference of the speed control capacities between the subject vehicle and the lead vehicle. That is, an increase of the inter-vehicle distance to the lead vehicle according to, or in proportion to, the capacity difference and/or the change of the inter-vehicle distance is provided.

Further, by controlling/adjusting the inter-vehicle distance to have a more appropriate value for each vehicle according to the restricted maximum deceleration of each of the convoy vehicles, the target inter-vehicle distance of each vehicle needs not have the same value as, the lowest capacity vehicle. In other words, the target inter-vehicle distance of each vehicle needs not be uniformly set to a greater value, thereby enabling a reduction of the inter-vehicle distance to the lead vehicle as well as enabling a more appropriate inter-vehicle distance for each vehicle.

In addition to the above, the apparatus may further include a second inter-vehicle distance detection unit for detecting the inter-vehicle distance between the subject vehicle and the following vehicle. The maximum deceleration restriction unit calculates the restricted value of the maximum deceleration based on the speed control capacity of the following vehicle received by the communication unit, the speed control capacity of the subject vehicle, and the inter-vehicle distance between the subject vehicle and the following vehicle detected by the second inter-vehicle distance detection unit. In such manner, the maximum deceleration of the subject vehicle is controlled to have a value that accords with the speed control capacity of the following vehicle, the speed control capacity of the subject vehicle, and the inter-vehicle distance between the subject vehicle and the following vehicle.

In another aspect of the present disclosure, the information exchanged by the communication unit of the travel support apparatus may include a convoy information for a convoy travel of multiple vehicles, along with a speed control capacity of a vehicle transmitting the information. The travel control unit may organize the convoy travel of vehicles by controlling the inter-vehicle distance to the lead vehicle based on the convoy information received by the communication unit. In addition, the comparison unit compares the speed control capacity of the subject vehicle with the speed control capacity of the lead vehicle, instead of the speed control capacity of the following vehicle. The target inter-vehicle distance determination unit determines a target inter-vehicle distance to the lead vehicle, such that the target inter-vehicle distance may be increased according to an increase of capacity difference between the subject vehicle and the lead vehicle when the comparison unit indicates that the lead vehicle has a higher speed control capacity than the subject vehicle.

When the speed control capacity of the subject vehicle is lower than the lead vehicle, the subject vehicle may take a longer time to reduce its speed to a target value than the lead vehicle. Therefore, when the subject vehicle and the lead vehicle start to brake at the same time and the greater the capacity difference between two vehicles is, the faster the subject vehicle may approach the lead vehicle. Thus, the subject vehicle may need a longer inter-vehicle distance to the lead vehicle.

Therefore, if the speed control capacity of the lead vehicle is higher than the subject vehicle, the target inter-vehicle distance of the subject vehicle to the lead vehicle is increased in proportion to the speed control capacity difference between the subject vehicle and the lead vehicle. Therefore, the lower the subject vehicle's speed control capacity is, the greater the target inter-vehicle distance to the lead vehicle becomes. Thus, due to the above-described control for the subject vehicle to have a more appropriate value of the target inter-vehicle distance to the lead vehicle according to the capacity difference between the subject vehicle and the lead vehicle, the target inter-vehicle distance of each vehicle need not have the same value as the lowest capacity vehicle. In other words, the target inter-vehicle distance of each vehicle needs not be uniformly set to a greater value, thereby enabling a reduction of the target inter-vehicle distance to the lead vehicle as well as enabling a more appropriate target inter-vehicle distance for each vehicle.

In another aspect of the present disclosure, the information exchanged by the communication unit of the travel support apparatus may include a convoy information for a convoy travel of multiple vehicles and a capacity calculation information for determining a speed control capacity of a vehicle transmitting the information, instead of the speed control capacity of the vehicle. The travel control unit organizes the convoy travel of the vehicles by controlling the inter-vehicle distance to the lead vehicle based on the convoy information received by the communication unit. Further, the apparatus includes a following vehicle speed control capacity calculation unit for calculating a speed control capacity of the following vehicle of the subject vehicle based on the capacity calculation information received by communication unit from the following vehicle. The comparison unit compares the speed control capacity of the subject vehicle with the speed control capacity of the following vehicle calculated by the following vehicle speed control capacity calculation unit. The maximum deceleration restriction unit restricts the maximum deceleration of the subject vehicle when the comparison unit indicates that the subject vehicle has a higher speed control capacity than the following vehicle.

Further, the capacity calculation information may be, for example, the weight of the vehicle, the maximum deceleration, information that enables calculation of the maximum deceleration, the presence/absence of the range sensor for independently detecting a distance to the lead vehicle, and information regarding the detection result of the range sensor.

In addition, the apparatus may include a lead vehicle speed control capacity calculation unit for calculating a speed control capacity of a lead vehicle based on the capacity calculation information received by the communication unit from the lead vehicle. The target inter-vehicle distance determination unit may determine the target inter-vehicle distance to the lead vehicle based on the restricted maximum deceleration of the subject vehicle, the speed control capacity of the subject vehicle, and the speed control capacity of the lead vehicle calculated by the lead vehicle speed control capacity calculation unit.

In addition, the apparatus may include a second inter-vehicle distance detection unit for detecting the inter-vehicle distance between the subject vehicle and the following vehicle. The maximum deceleration restriction unit preferably calculates the restricted value of the maximum deceleration of the subject vehicle based on the speed control capacity of the following vehicle calculated by the following vehicle speed control capacity calculation unit, the speed control capacity of the subject vehicle, and the inter-vehicle distance between the subject vehicle and the following vehicle detected by the second inter-vehicle distance detection unit. In such manner, the maximum deceleration of the subject vehicle is controlled to have a value that accords with the speed control capacity of the following vehicle, the speed control capacity of the subject vehicle, and the inter-vehicle distance between the subject vehicle and the following vehicle.

In another aspect of the present disclosure, the information exchanged by the communication unit of the travel support apparatus may include a convoy information for a convoy travel of multiple vehicles and a capacity calculation information for determining a speed control capacity of a vehicle transmitting the information. The travel control unit organizes the convoy travel of vehicles by controlling the inter-vehicle distance to the lead vehicle based on the convoy information received by the communication unit. The apparatus further includes a lead vehicle speed control capacity calculation unit for calculating a speed control capacity of a lead vehicle based on capacity calculation information received by the communication unit from the lead vehicle. The comparison unit compares the speed control capacity of the subject vehicle with the speed control capacity of the lead vehicle, and the target inter-vehicle distance determination unit determines a target inter-vehicle distance to the lead vehicle. The target inter-vehicle distance is increased according to an increase of capacity difference between the subject vehicle and the lead vehicle when the comparison unit indicates that the subject vehicle has a lower speed control capacity than the lead vehicle.

In addition, the speed control capacity calculation unit may calculate the speed control capacity of the subject vehicle in the following manner.

That is, the apparatus may further include a capacity calculation information acquisition unit for acquiring capacity calculation information of the subject vehicle from a device installed in the subject vehicle. The speed control capacity calculation unit may calculate the speed control capacity of the subject vehicle based on the capacity calculation information acquired by the capacity calculation information acquisition unit.

Further, the apparatus may further include a memory unit for having a speed control capacity of the subject vehicle stored therein, and the speed control capacity calculation unit retrieves the speed control capacity of the subject vehicle from the memory unit.

In addition to the above, the communication unit may transmit the speed control capacity of the subject vehicle through vehicle-to-vehicle communication. In such manner, due to the transmission of the calculated capacity of the subject vehicle to surrounding vehicles, the speed control capacity of the subject vehicle need not be calculated by surrounding vehicles (i.e., by the travel support apparatus dispose in other vehicles).

Further, the communication unit may transmit the capacity calculation information of the subject vehicle acquired by the capacity calculation information acquisition unit.

A system including a plurality of vehicles each having a travel support apparatus enables each of the plurality of vehicles respectively equipped with such apparatus to have a reduced inter-vehicle distance to the lead vehicle while controlling/maintaining the inter-vehicle distance to an appropriate value.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

Figure 1:
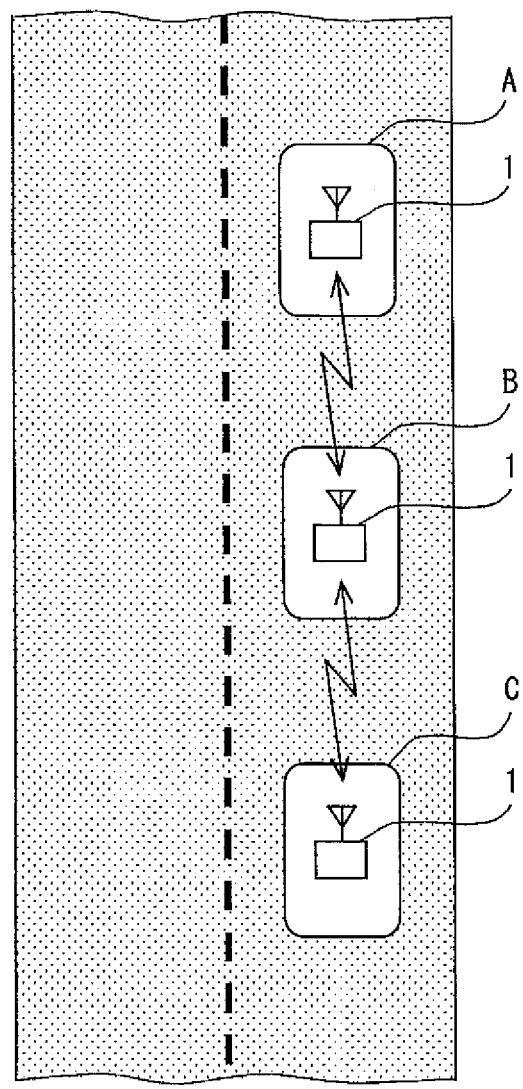
FIG. 1 is an illustration of a travel support system of the present disclosure.

The embodiment of the present disclosure is described with reference to the drawings. FIG. 1 is an illustration of a travel support system 100 of the present disclosure. The travel support system 100 in FIG. 1 includes multiple travel support apparatuses 1 respectively installed in multiple vehicles (i.e., vehicles A-C), where one travel support apparatus 1 is installed in each of the vehicles A,B,C.

The configuration of FIG. 1, which includes three travel support apparatuses 1 in one travel support system 100, may be modified to include four or more apparatuses 1 in one travel support system 100, or only one or two apparatuses 1 in one travel support system 1, and is not limited to the three travel support apparatuses 1 depicted.

Figure 2:
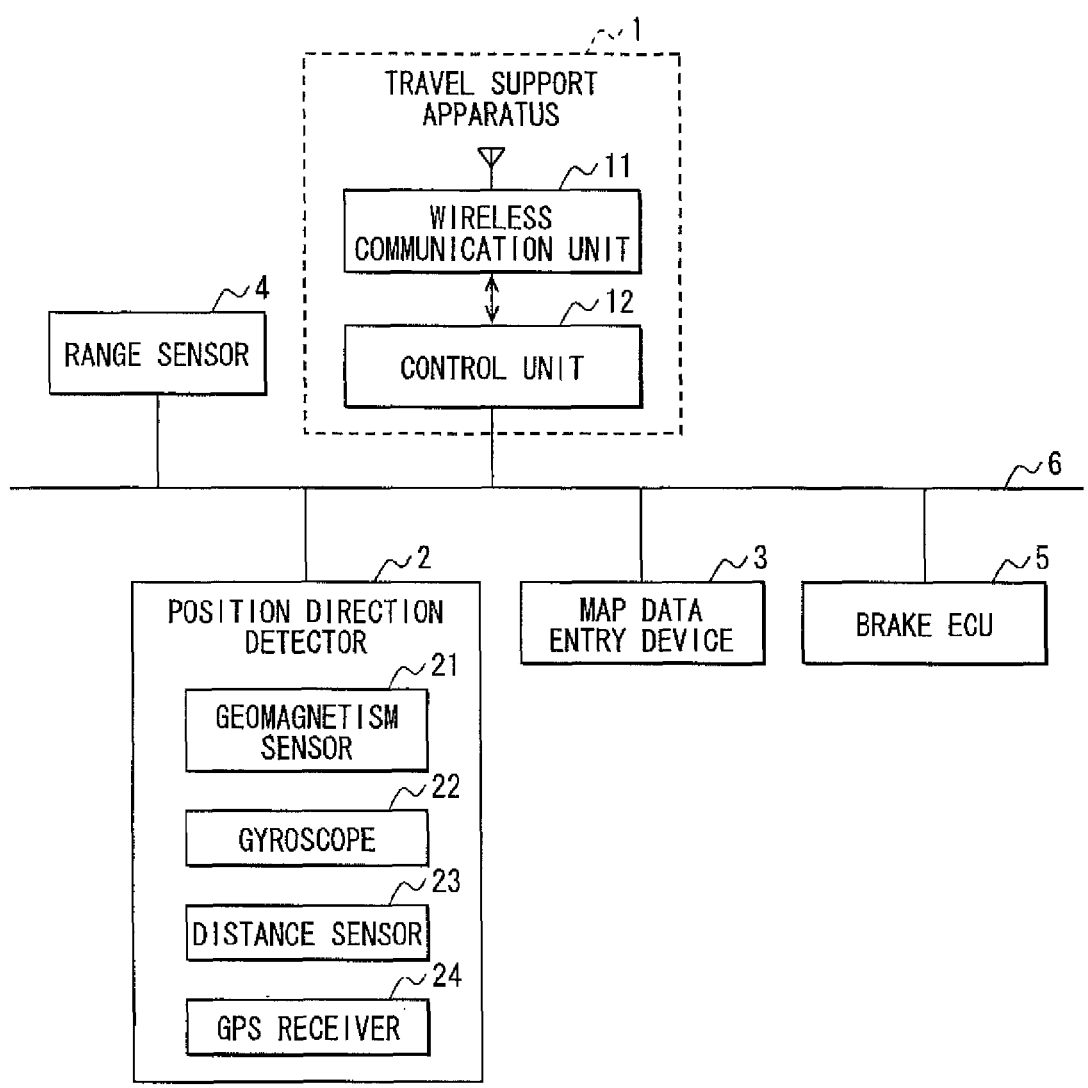
FIG. 2 is a block diagram of a travel support apparatus of the present disclosure.

With reference to FIG. 2, the travel support apparatus 1, which is disposed in each of the vehicles includes a wireless communication unit 11 and a control unit 12. Further, the travel support apparatus 1 is communicably coupled to components in the vehicle, such as a position direction detector 2, a map data entry device 3, a range sensor 4, and a brake ECU 5. For instance, the travel support apparatus 1, the position direction detector 2, the map data entry device 3, the range sensor 4, and the brake ECU 5 may be communicably coupled with each other by an in-vehicle local area network (LAN) 6, which is compliant to a communication protocol, such as Controller Area Network (CAN).

The position direction detector 2 successively detects the current position and the current travel direction of the vehicle based on information from various sensors, such as a geomagnetism sensor 21 detecting geomagnetism, a gyroscope 22 detecting the angular velocity of the yaw of the vehicle about the vertical axis, a distance sensor 23 detecting the travel distance of the vehicle, and a Global Positioning System (GPS) receiver 24 detecting the current position of the vehicle based on a signal from GPS satellites. These sensors respectively have errors of different natures, thereby compensating with each other for the improved detection accuracy.

Each of the above-described sensors may be used by itself, depending on the accuracy, or, may be combined with other sensors not-described. Further, for example, the current position may be represented as a combination of longitude and latitude, and the current travel direction may be represented as a direction angle from the north which serves as a reference direction. The direction angle may be detected by the geomagnetism sensor 21, may be detected by the gyroscope 22, or may be detected by a combination of both. In the following, the current position detected by the GPS receiver 24 is designated as a satellite-measured position.

Further, in the present embodiment, the GPS receiver 24 using the GPS system may be substituted with a receiver of other satellite positioning system.

The map data entry device 3 has a storage medium (not illustrated) attached to it, and used to input map data stored in such storage medium. The map data includes link data and node data showing a road on the map. The link data includes an identification number (i.e., link ID) for identifying a link, a link length representing a length of the link, a link direction, coordinates of a link start point and a link end point (i.e., longitude and latitude), a road name, a road type, a one-way attribute, a road width, the number of lanes, a right/left turn only lane and the number of such lanes, a speed limit and the like. Further, the node data includes a node ID representing a node point such as an intersection, a merge point, a branch point or the like on the road map, together with node coordinates, a node name, connecting fink IDs of the links that are connected to the node, an intersection type or the like of the node.

Further, the map data may be provided by the storage medium coupled to the map data entry device 3, and may also be provided by other media, or the data may be downloaded from a server through a server communication unit (not illustrated), The range sensor 4 is an independent sensor independently detecting the presence of an obstacle in front of the vehicle that is equipped with the travel support apparatus 1 as well as a distance to such obstacle, which may be used in a pre-crash safety system of a well-known type. Specifically, the range sensor 4 detects the obstacle without using information from other vehicles (i.e., surrounding vehicles), or without using information from devices on other vehicles. In other words, the range sensor 4 is "independent" from devices disposed in other vehicles.

To further describe the present disclosure, a subject vehicle is provided in the following, where the subject vehicle includes the travel support apparatus 1 and the range sensor 4. The subject vehicle is able to detect the presence of a lead vehicle that is traveling immediately in front of the subject, vehicle and a distance from such lead vehicle by way of the range sensor 4. The lead vehicle is a vehicle in the same lane as the subject vehicle, traveling just in front or immediately in front of the subject vehicle, and may also be designated as a right-ahead vehicle or an immediate lead vehicle. A following vehicle is a vehicle in the same lane as the subject vehicle, traveling just behind or immediately behind the subject vehicle, where the following vehicle may also be designated as a right-behind vehicle or an immediate following vehicle. In addition, both the lead vehicle and the following vehicle also include the travel support apparatus 1, and the subject vehicle is communicably coupled with the lead vehicle and the following vehicle.

As for the range sensor 4, a device such as a laser radar, a millimeter wave radar or the like, which transmits a detection wave and receives a reflected wave from a reflecting object for detecting a distance to the object, may be employed. Further, an imaging device such as a camera may be used as the range sensor 4. When the camera is used as the range sensor 4, two cameras are used to stereoscopically capture an obstacle, for the purpose of detecting the presence of the obstacle and the distance to the obstacle. In the present embodiment, a well-known laser radar positioned at a front end of the vehicle is used as the range sensor 4, as an illustrative example.

The brake ECU 5 is a combination of a microcomputer and other components, and the microcomputer is a combination of parts such as a CPU, a ROM, a RAM, a backup RAM and the like, and performs various processes in regards to the braking of the vehicle, by performing various programs stored in the ROM, based on, for example, vehicle information including: a vehicle speed detected as a signal of the vehicle speed sensor, a brake switch on condition detected as a signal from a brake switch, a lateral/longitudinal acceleration detected as a signal from acceleration sensors, and a brake fluid pressure detected as a signal from the brake fluid sensor.

The wireless communication unit 11 of the travel support apparatus 1 has an antenna for wireless communication with other vehicles in order to exchange information, such as vehicle information. In other words, vehicle-to-vehicle communication is performed by the antenna without using a telephone communication through a telephone network. For instance the wireless communication of a radio wave of 700 MHz band may be used for vehicle-to-vehicle communication with other vehicles within a distance of 1 km from the subject vehicle. Or, for example, the wireless communication of a radio wave of 5.9 GHz band may be used for vehicle-to-vehicle communication with other vehicles within a distance of 500 m from the subject vehicle. The wireless communication unit 11 may be provided as a communication unit in claims. Further, the wireless communication unit 11 transmits information at a transmission cycle of regular intervals under control of the control unit 12. The other vehicle may be designated as a partner vehicle in the following.

The control unit 12 of the travel support apparatus 1 is a well-known type computer, having a bus fine for connecting a processor and memories, such as a CPU, a ROM a RAM, an EEPROM, as well as an input/output (none illustrated). The control unit 12 performs various processes, based on various information from the wireless communication unit 11, the position direction detector 2, the map data entry device 3, the range sensor 4, and the brake ECU 5.

The control unit 12 calculates a speed control capacity of the subject vehicle, which controls a speed of the subject vehicle. The control unit 12 may be provided as a speed control capacity calculation unit in claims. The speed control capacity includes (i) a deceleration delay time and (ii) a deceleration magnitude. The deceleration delay time may be provided as a response time from a start of braking to actual deceleration ("a brake response time") or a time to automatic deceleration after detecting a reduction of an inter-vehicle distance to the lead vehicle by the range sensor 4, at a time of detection of such distance to have a lower-than-threshold value ("a distance-based response time"). The deceleration magnitude may be provided as a maximum deceleration. In the description of the present embodiment, a value of the maximum deceleration is used as the deceleration magnitude.

As for calculation of the speed control capacity, such capacity may be calculated based on pre-stored deceleration delay time and/or deceleration magnitude in a non-volatile memory, such as an EEPROM of the control unit 12 in the subject vehicle. Further, such pre-stored values may be based on a so-called "catalog value" that is derived/calculated by experiments or by estimation. Therefore, the control unit 12 (i.e., a nonvolatile memory of the control unit 12) may be provided as a memory unit in claims.

The speed control capacity may be determined using capacity calculation information. The capacity calculation information includes the weight of the vehicle, the catalog value of the maximum deceleration (i.e., a standard maximum deceleration, hereinafter), information that enables calculation of the deceleration of the vehicle, such as the maximum brake magnitude, whether the vehicle is equipped by the range sensor 4, and whether the range sensor 4 has succeeded or failed to detect an obstacle. The control unit 12 acquires the capacity calculation information and may be referred to as the capacity calculation information acquisition unit in claims.

The standard maximum deceleration in the above context is not a variable value such as the maximum deceleration (i.e., the deceleration magnitude), which may be controlled or restricted described later in detail. That is, the standard maximum deceleration is a fixed value, which is determined based on experiments or estimation. Further, the maximum brake magnitude is the maximum brake fluid pressure that can be used in the vehicle, which may be a catalog value determined by experiments or estimation, or may be a restricted brake fluid pressure to be described later.

The weight of the vehicle is closely related to the brake response time (i.e., deceleration delay time) of speed control capacity, and the maximum deceleration is closely related to the deceleration magnitude of the speed control capacity. Further, whether the vehicle is equipped with the range sensor 4 and whether the range sensor 4 has detected the obstacle or not are closely related to the speed control capacity, such as the distance-based response time. Therefore, the speed control capacity is more accurately calculated by utilizing information such as a vehicle weight, the maximum deceleration of the vehicle, information for the calculation of the maximum deceleration, presence/absence of the range sensor 4, and information regarding the success or failure of detection by the range sensor 4.

Information for calculating the maximum deceleration of the vehicle, such as the vehicle weight, a standard maximum deceleration of the vehicle, and the maximum brake magnitude, as well as information on presence/absence of the range sensor 4 may be stored and retrieved from a non-volatile memory, such as an EEPROM of the control unit 12.

Information in regards to the detection success/failure by the range sensor 4 may be acquired based on a signal from the range sensor 4. For instance, when the range sensor 4 detects an obstacle, success or failure of the detection by the range sensor 4 is designated as "Detection succeeded," and, when the range sensor 4 does not detect an obstacle, success or failure of the detection by the range sensor 4 is designated as "Detection failed." Further, if it is determined as a situation that an obstacle within a detection range of the range sensor 4 is not detected (i.e., "sensor lost situation"), such situation may be designated as "Detection failed."

Whether or not the range sensor 4 is experiencing a sensor lost situation is determined in the following manner. Based on a current position of the lead vehicle received from the travel support apparatus 1 of the Lead vehicle and a current position of the subject vehicle, an inter-vehicle distance between the subject vehicle and the lead vehicle is calculated. Then, if the range sensor 4 is not detecting an obstacle. (i.e., the lead vehicle) even when the calculated inter-vehicle distance is equal to or smaller than the detection range of the range sensor 4, it is determined as a sensor lost situation.

Further, a situation in which a certain duration (e.g., tens of seconds) of obstacle detection by the range sensor 4 followed by a preset duration (e.g., a couple of seconds) of no obstacle detection may be determined as the sensor lost situation, and, after such preset duration, the situation may be determined as no sensor lost situation. Furthermore, alternation of successful detection and detection failure of the obstacle at a few second interval for multiple times may also be determined as the sensor lost situation.

The deceleration delay time of the speed control capacity of a vehicle may be determined based on the capacity calculation information. Specifically, base on, for example, the presence/absence of the range sensor 4 and/or the detection success/failure by the range sensor 4 a time period is set as the deceleration delay time. For instance, when the vehicle is equipped with the range sensor 4 (i.e., "Equipped") and the detection by the range sensor 4 is "Detection succeeded," the deceleration delay time may be set to 0.4 seconds. On the other hand, when the vehicle is equipped with the range sensor 4 (i.e., "Equipped") and the detection by the range sensor 4 is "Detection failed," the deceleration delay time may be set to 1 second. Further, the time period provided as the deceleration delay time may be increased in proportion to the weight of the vehicle.

Further, the maximum deceleration of the vehicle retrieved from the nonvolatile memory may be used as the deceleration magnitude, or the maximum brake magnitude retrieved from the nonvolatile memory may be used as the deceleration magnitude.

Further, the control unit 12 controls the wireless communications unit 11 to perform information transmission at a transmission cycle of regular intervals. The information transmitted by the wireless communications unit 11 may include, for example, a position and a travel direction of the subject vehicle, information regarding a change of behavior of the subject vehicle, such as braking (i.e., vehicle state information, hereinafter), and the speed control capacity of the subject vehicle. Further, when a current position and a travel direction the subject vehicle are transmitted, a GPS time of detecting such position/direction is added.

The control unit 12 acquires, from the position direction detector 2, a current position and a travel direction of the subject vehicle. The vehicle state information of the subject vehicle may be acquired from the brake ECU5, as the vehicle speed, the longitudinal/lateral acceleration, the signal regarding an ON state of the brake switch, and the brake fluid pressure. Further, the vehicle state information may be acquired from an EPS_ECU (not illustrated) as a steering torque or a steering angle of a steering wheel. As provided above, the speed control capacity includes the deceleration delay time and the deceleration magnitude of the subject vehicle.

In addition, the control unit 12 of the subject vehicle receives a current position, a travel direction, vehicle state information, and the speed control capacity from other vehicles via the travel support apparatus 1. Based on the information received from other vehicles, such as satellite-measured position and travel direction and information regarding the subject vehicle including the satellite-measured position and the travel direction, a travel loci of the subject vehicle and other vehicles is determined, thereby enabling a distinction between the subject vehicle and other vehicles and providing the relative positions of the other vehicles relative to the subject vehicle. For instance, the control unit 12 identifies the lead vehicle and/or the following vehicle based on the relative positions to the subject vehicle and map data. For instance, as provided earlier, the lead vehicle is a vehicle in the same lane as the subject vehicle, traveling just in front or immediately in front of the subject vehicle, and the following vehicle is a vehicle in the same lane as the subject vehicle, traveling just behind or immediately behind the subject vehicle. Here, the correspondence between the subject vehicle and other vehicle regarding the satellite-measured positions and the travel directions at a time of the above identification of the lead/following vehicle is established based on the GPS time at the time of detection of such positions and directions.

Further, the control unit 12 of the subject vehicle detects a distance to the lead vehicle (i.e., an inter-vehicle distance to the lead vehicle) by using the range sensor 4. The subject vehicle is then controlled to follow the lead vehicle by keeping the inter-vehicle distance at a preset target inter-vehicle distance (i.e., a convoy travel of vehicles). The convoy travel of vehicles may be performed according to, a well-known method. For example, by sending instructions to the brake ECU 5 and an engine ECU the subject vehicle accelerates/decelerates, and by sending instructions to a steering ECU that controls steering actuators, the tires of the subject vehicle are steered for organizing the convoy travel of the vehicles. The control unit 12 may also control the convoy travel based on the vehicle state information described above which is received from the travel support apparatus 1 of the lead vehicle. Therefore, the control unit 12 may be provided as a travel control unit in claims.

Further, in the present embodiment, the inter-vehicle distance to the lead vehicle is detected by the range sensor 4. However, the inter-vehicle distance may be detected in a different manner. For example, the control unit 12 may calculates such distance based on the current position of the lead vehicle received from the lead vehicle and the current position of the subject vehicle from the position direction detector 2 of the subject vehicle, as a distance between two vehicles at such reception time Further, correspondence between the current position of the subject vehicle and the current position of, the lead vehicle may be established based on the GPS time of detection of the current positions. Therefore, information of the current position of the lead vehicle may be provided as convoy information in claims, and the control unit 12 may be provided as a first inter-vehicle distance detection unit in claims.

Furthermore, the control unit 12 performs a process that restricts the maximum deceleration of the subject vehicle and sets the target inter-vehicle distance to the lead vehicle based on information from the lead vehicle and the following vehicle, which may be designated as a target distance process.

Figure 3:
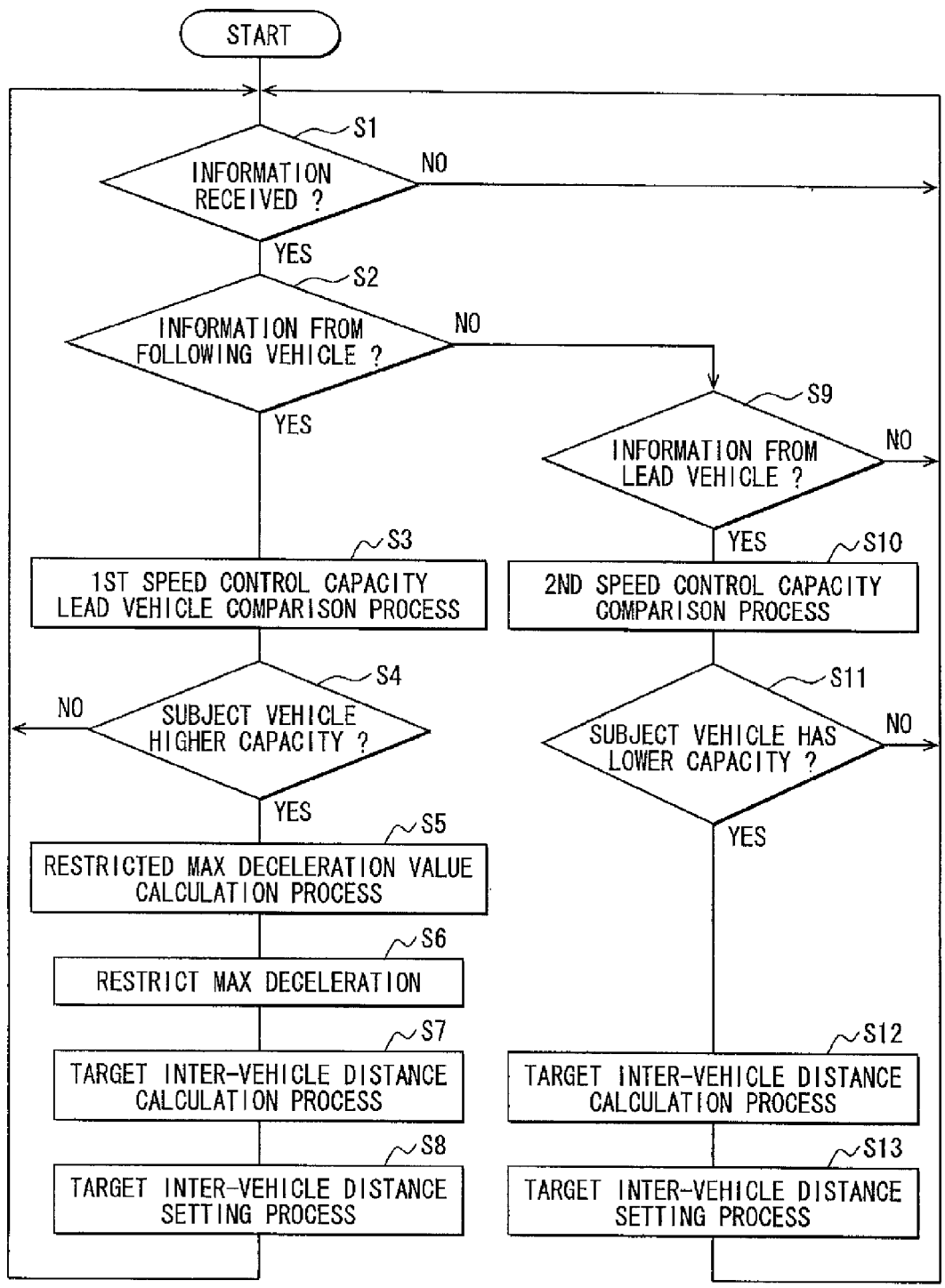
FIG. 3 is a flowchart of a target distance process performed by a control unit of the travel support apparatus.

With reference to FIG. 3, the target distance process is described in detail. This process is started when, for example, the ignition power supply of the subject vehicle is turned on, which turns on a power supply of the travel support apparatus 1. Further, the process is finished when, for example, the ignition power supply of the subject vehicle is turned off, which turns off a power supply of the travel support apparatus 1.

In step S1, the process determines whether information transmitted from the travel support apparatus 1 of other vehicle has been received. For instance, if information received by the wireless communications unit 11 is provided to the control unit 12, the process determines that, information from other vehicle has been received (step S1, YES), at which point the process proceeds to step S2. Further, when it is determined that information has not been received (step S1, NO), the process returns to step S1.

In step S2, the process determines whether the information received in S1 is from the following vehicle of the subject vehicle. For example, such determination may be made when the current position and the travel direction of the other vehicle, which is provided in the information received, are in a "successive" relationship with the travel locus of the following vehicle identified in the above-described manner. If it is determined that the information received is from the following vehicle (step S2, YES), the process proceeds to step S3. If the information received is not from the following vehicle (step S2, NO), the process proceeds to step S9.

In the present embodiment, when the travel support apparatus 1 of the vehicle A receives information from the travel support apparatus 1 of the vehicle B, the control unit 12 of the vehicle A determines that the information received is from the following vehicle. When, the travel support apparatus 1 of the vehicle B receives the information from the travel support apparatus 1 of the vehicle G, the control unit 12 of the vehicle B determines that the information received is from the following vehicle.

In step S3, a first speed control capacity comparison process is performed, after which the process proceeds to step S4. The first speed control capacity comparison process compares the speed control capacity of the subject vehicle, which is determined by the control unit 12 of the subject vehicle, with the capacity of the following vehicle, which is included in the information received in step S1 from the following vehicle. Therefore, the control unit 12 may be provided as a comparison unit in claims.

When it is determined that the speed control capacity of the following vehicle is lower than the speed control capacity of the subject vehicle in step S4 (step S4, YES), the process proceeds to step S5. If the speed control capacity of the following vehicle is not lower than the speed control capacity of the subject vehicle (step S4, NO), the process returns to step S1 to repeat the process.

More practically, the speed control capacity of the following vehicle is determined as lower than the speed control capacity of the subject vehicle when the deceleration delay time of the following vehicle is greater than the deceleration delay time of the subject vehicle and the deceleration magnitude of the following vehicle is lower than the deceleration magnitude of the subject vehicle.

If only one of the two conditions is lower than the subject vehicle, the determination may be based on a speed reduction time. The speed reduction time is a time period needed to reduce the current speed of a vehicle to a certain target speed, which may be arbitrarily set. The deceleration delay time and the deceleration magnitude of the following vehicle and the subject vehicle are used to determine the speed reduction time for both the following vehicle and the subject vehicle. Accordingly, when the speed reduction time of the following vehicle is greater than the subject vehicle, the speed control capacity of the following vehicle is lower than the subject vehicle, and vice versa.

In step S5, a restricted maximum deceleration, value determination process is performed to calculate a maximum deceleration value that is restricted(i.e., a restricted maximum deceleration value). The restricted maximum deceleration value is based on the speed control capacity of the subject vehicle, the speed control capacity of the following vehicle, and the inter-vehicle distance between the subject vehicle and the following vehicle.

Here, the inter-vehicle distance may be calculated based on the current position of the lead vehicle received from the lead vehicle and the current position of the subject vehicle from the position direction detector 2 of the subject vehicle by the control unit 12, as a distance between two vehicles at such reception time. Therefore, the control unit 12 may be provided as a second inter-vehicle distance detection unit in claims. Further, correspondence between the current position of the subject vehicle and the current position of the lead vehicle may be established based on the GPS time of detection of the current positions of those vehicles.

The restricted maximum deceleration value may be determined in the following manner. As a definition, the maximum deceleration of the following vehicle (i.e., the deceleration magnitude) is a (m/s²), a deceleration delay time against the subject vehicle is tr (s), and the maximum deceleration of the subject vehicle is β (m/s²). The deceleration delay time against the subject vehicle tr (s) is calculated as a difference between the deceleration delay time of the subject vehicle and deceleration delay time of the following vehicle. Further, the inter-vehicle distance between the subject vehicle and the following vehicle before a start of deceleration of the subject vehicle is L (m), and a time from the start of deceleration of the subject vehicle to the time of calculation of the restriction maximum deceleration value is t (s). Further, Lmin is the minimum allowable inter-vehicle distance between the following vehicle and the subject vehicle, which may be arbitrarily set. In the present embodiment, Lmin is set to 5 (m).

When t (s) is greater than tr (s) (i.e., t>tr), the maximum deceleration value of the subject value is restricted to satisfy equation 1. The term $\frac{1}{2} \times \alpha \times t^2$ in equation 1 represents a decrease of the inter-vehicle distance due to the deceleration of the subject vehicle, and the term $\frac{1}{2} \times \beta \times (t-tr)^2$ in equation 1 represents an increase of the inter-vehicle distance due to the deceleration of the following vehicle.

$$L-[\tfrac{1}{2} \times \alpha \times t^2 - \tfrac{1}{2} \times \beta \times (t-tr)^2] > Lmin \quad \text{(Equation 1)}$$

When t (s) is equal to or smaller than tr (s) (i.e., t ≤ tr), the maximum deceleration value is restricted to satisfy the following equation 2. The term $\frac{1}{2} \times \alpha \times tr^2$ in equation 2 represents a decrease of the inter-vehicle distance due to the deceleration of the subject vehicle.

$$L - \tfrac{1}{2} \times \alpha tr^2 > Lmin \quad \text{(Equation 2)}$$

Therefore, the restricted maximum deceleration is provided as a value that satisfies both equation 1 and equation 2. The restricted maximum deceleration value may be respectively different for the t>tr case and for the t≤tr case, or may be same for both cases.

As described above, a decrease of the inter-vehicle distance due to the deceleration of the subject vehicle and the increase of the inter-vehicle distance due to the deceleration of the following vehicle are calculated based on the speed control capacities of the subject vehicle and the following vehicle. Then, the calculated decrease and increase are added/subtracted to/from the inter-vehicle distance between the two vehicles before the start of the deceleration, to have the Lmin value, which should be kept at least equal to a preset value (i.e., a minimum value). Therefore, the deceleration a to keep such minimum preset value is determined as the restricted maximum deceleration value.

The method for calculating the restricted maximum deceleration value in the above is only an example, and may be changed. That is, other parameters and/or other equations may be used, as long as the inter-vehicle distance at the time of deceleration is kept at least equal to or above Lmin.

Then, in step S6, the deceleration of the subject vehicle is restricted, such that it does not exceed the value calculated in step S5 (i.e., the restricted maximum deceleration value), and the process proceeds to step S7. Therefore, the control unit 12 may be provided as a maximum deceleration restriction unit in claims. The restriction on the deceleration of the subject vehicle may be realized by restricting (i.e., lowering) the brake fluid pressure by sending instructions to the brake ECU 5 or the like.

In step S7, the process performs the target distance process, and the process proceeds to step S8. The target distance process calculates a target inter-vehicle distance from the subject vehicle to the lead vehicle based on the restricted maximum deceleration value of the subject vehicle determined in step S5, the speed control capacity of the subject vehicle, and the speed control capacity of the lead vehicle. In this case, the speed control capacity of the lead vehicle is assumed to be already received. If the speed control capacity of the lead vehicle has not been received, the process of step S7 may be postponed until it is received.

The target inter-vehicle distance to the lead vehicle may be calculated as follows practically. As a definition, the maximum deceleration of the subject vehicle (i.e., the deceleration magnitude) is β (m/s²), a deceleration delay time against the lead vehicle is $t_h$ (s), and the maximum deceleration of the lead vehicle is γ (m/s²). The deceleration delay time against the lead vehicle $t_h$ (s) is calculated as a difference between the deceleration delay time of the subject vehicle and deceleration delay time of the lead vehicle. Further, a time from the start of deceleration of the lead vehicle is t (s). Further, Lmin is the minimum allowable inter-vehicle distance between the lead vehicle and the subject vehicle, which may be arbitrarily set. In the present embodiment, Lmin is set to 5 (m).

When t (s) is equal to or smaller than $t_h$ (s) (i.e., t≤$t_h$), a target inter-vehicle distance $L_O$ (m) is preferably set to a value L1 in equation 3. The term $\frac{1}{2} \times \gamma \times th^e$ in equation 3 represents a decrease of the inter-vehicle distance due to the deceleration of the lead vehicle.

$$L1 = Lmin + \tfrac{1}{2} \times \gamma \times t_h^2 \quad \text{(Equation 3)}$$

When t (s) is greater than $t_h$ (s) (i.e., t>$t_h$), the target inter-vehicle distance $L_O$ (m) is preferably set to a value L2 in equation 4. The term $\frac{1}{2} \times \gamma \times t^2$ in equation 4 represents a decrease of the inter-vehicle distance due to the deceleration of the lead vehicle, and the term $\frac{1}{2} \times \beta \times (t-t_h)^2$ in the equation 4 represents an increase of the inter-vehicle distance due to the deceleration of the subject vehicle. Further, "max" in the equation 4 represents the maximum value among the values that satisfy $[\tfrac{1}{2} \times \gamma \times t^2 - \tfrac{1}{2} \times \beta \times (t-t_h)^2]$.

$$L2 = Lmin + \max[\tfrac{1}{2} \times \gamma \times t^2 - \tfrac{1}{2} \times \beta \times (t-t_h)^2] \quad \text{(Equation 4)}$$

In the target distance process, a smaller one of L1 and L2 is provided as the target inter-vehicle distance $L_O$ (m). Further, a greater one of the L1 and L2 may be provided as the target inter-vehicle distance $L_O$ (m). Further, L1 and L2 increase as $t_h$ increases As described above, based on the maximum deceleration (i.e., the restricted maximum deceleration value) β of the subject vehicle, the speed control capacity (i.e., more specifically, the deceleration delay time) of the subject vehicle, and the speed control capacity of the lead vehicle (i.e., more specifically, the deceleration delay time and the maximum deceleration γ), the decrease of the inter-vehicle distance due to the deceleration of the lead vehicle and the increase of the inter-vehicle distance due to the deceleration of the subject vehicle are calculated. Then, these calculated increase/decrease are added/subtracted to/from the Lmin, to calculate the target inter-vehicle distance $L_0$. In other words, the distance $L_0$ is calculated as a distance that has a reserve (i.e., a room, or a margin) for the change of the inter-vehicle distance at the time of deceleration due to the difference between the speed control capacity of the subject vehicle and the speed control capacity of the lead vehicle. Further, the above-described method of the target inter-vehicle distance is an example, and may be changed. That is, other parameters and/or other equations may be used, as long as the target inter-vehicle distance $L_0$ enables that the inter-vehicle distance between the subject vehicle and the lead vehicle at the time of deceleration is kept at least equal to or above the Lmin. In step S8, the process performs a target inter-vehicle distance setting process, and the process returns to step S1 to repeat the flow. The target inter-vehicle distance setting process in step S8 sets, as the target inter-vehicle distance, the target inter-vehicle distance calculated by the target inter-vehicle distance calculation process in the preceding step S7. Therefore, the control unit 12 may be provided as a target inter-vehicle distance determination unit in claims.

When the process, in step S2, determines that the information received in step S1 is not from the following vehicle (step S2, NO), the process determines, in step S9, whether the information is from the lead vehicle. Whether the information has been received from the lead vehicle may be determined in the same manner as the determination of whether the information was received from the following vehicle. When the information is from the lead vehicle (step S9, YES), the process proceeds to step S10, and when the information is not from the lead vehicle (step S9, NO), the process returns to step S1.

In the example of the present embodiment, when the travel support apparatus 1 of the vehicle B receives information from the travel support apparatus 1 of the vehicle A, the travel support apparatus 1 of the vehicle B determines the information is from the lead vehicle. Or, when the travel support apparatus 1 of vehicle C receives information from the travel support apparatus 1 of the vehicle B, the travel support apparatus 1 of vehicle C determines that the information is from the lead vehicle.

In step S10, a second speed control capacity comparison process is performed, and the process proceeds to step S11. By the second speed control comparison process, the speed control capacity of the subject vehicle which is calculated by the control unit 12 of the subject vehicle and the speed control capacity of the lead vehicle which is received from the lead vehicle are compared with each other.

When the speed control capacity of the lead vehicle is greater than the speed control capacity of the subject vehicle in step S11 (step S11, YES), the process proceeds to step S12. Further, when the speed control capacity of the lead vehicle is less than the speed control capacity of the subject vehicle either (step S11, NO), the process returns to step S1 to repeat the flow.

More practically, the speed control capacity of the lead vehicle is determined as higher than the speed control capacity of the subject vehicle when the deceleration delay time of the lead vehicle is smaller than the subject vehicle and the deceleration magnitude of the lead vehicle is greater than the subject vehicle. Further, if only one of the above two conditions is higher than the subject vehicle, the determination may be made in the following manner. That is, for example, based on the deceleration delay time and the deceleration magnitude of the lead vehicle and the subject vehicle, the speed reduction time to reduce the current speed to a certain target speed, which may be arbitrarily set, is calculated for both of the lead vehicle and the subject vehicle. Then, it is determined that the lead vehicle's capacity is higher than the subject vehicle if the speed reduction time of the lead vehicle is smaller than the subject vehicle, and, it is determined that the lead vehicle's capacity is not higher than the subject vehicle if the speed reduction time of the lead vehicle is not smaller than the subject vehicle.

In step S12, the process performs a target inter-vehicle distance calculation process, and the process proceeds to step S13. The target inter-vehicle distance calculation process of S12 uses the maximum value among the deceleration magnitudes calculated by the control unit 12 of the subject vehicle for calculating the target inter-vehicle distance to the lead vehicle in the same manner as step S7, instead of using the maximum value of the restricted maximum deceleration value from the restricted maximum deceleration value calculation process of step S5. In other words, by the target inter-vehicle distance calculation process here, the process calculates the target inter-vehicle distance to the lead vehicle based on the speed control capacity of the subject vehicle, which is calculated by the control unit 12 of the subject vehicle and the speed control capacity of the lead vehicle which is received from the lead vehicle.

In step S13, the process performs the target inter-vehicle distance setting process, and the process returns to step S1 to repeat the process. The target inter-vehicle distance setting process of step S13 sets, as the target inter-vehicle distance to the lead vehicle, the distance calculated by the target inter-vehicle distance calculation process of step S12.

For example, when the subject vehicle is vehicle B and the speed control capacity of the following vehicle (i.e., vehicle C) is lower than vehicle B (i.e., the subject vehicle), the maximum deceleration of vehicle B is restricted and the inter-vehicle distance to the lead vehicle (i.e., vehicle A) is set to have a greater value that is increased in proportion to the difference of the speed control capacities between vehicle B (i.e., the subject vehicle) and vehicle A (i.e., the lead vehicle). In other words, the inter-vehicle distance is increased as the capacity difference of two vehicles increase. Further, when the subject vehicle is vehicle B and the speed control capacity of vehicle A (i.e., the lead vehicle) is higher than vehicle B (i.e., the subject vehicle), the inter-vehicle distance to the lead vehicle is set to have the above-described greater value.

Further, except for the time when the target inter-vehicle distance is set by the target inter-vehicle distance setting process, such distance may be set to a default standard value. Such standard value may be arbitrarily set, that is, may be set according to the speed of the vehicle, or may be set to a constant value.

The advantageous effects of the present disclosure are described in the following. The following vehicle may have a lower capacity than the subject vehicle, and thus may take more time to reduce its speed to the target speed. Therefore, if the subject vehicle and the following vehicle start to brake at the same time, the following vehicle gradually approaches the subject vehicle. Therefore, the subject vehicle may need a greater inter-vehicle distance from the following vehicle.

With regards to the present disclosure, when the following vehicle has the lower capacity than the subject vehicle, the maximum deceleration of the subject vehicle is restricted based on the speed control capacity of the following vehicle, the speed control capacity of the subject vehicle, and the inter-vehicle distance between the subject vehicle and the following vehicle, so that the inter-vehicle distance is maintained at a distance greater than or equal to the distance Lmin. That is, the inter-vehicle distance is prevented from falling below the distance Lmin by the control (i.e., restriction) of the maximum deceleration of the subject vehicle.

Therefore, the speed reduction time of the subject vehicle and the speed reduction time of the immediate following vehicle having the lower capacity are closer, thereby preventing the immediate following vehicle to gradually approach the subject vehicle to reduce the inter-vehicle distance below Lmin, even when both vehicles start to brake at the same time. Thus, the inter-vehicle distance to the lead vehicle (i.e., a real inter-vehicle distance or the target inter-vehicle distance between vehicles) is set to have a smaller value. As a result, while appropriately controlling the inter-vehicle distance of each vehicle, the inter-vehicle distance to the lead vehicle is reduced to a smaller value.

Further, the subject vehicle, having the lower capacity than the lead vehicle, may take more time to reduce its speed to the target speed. Therefore, if the subject vehicle and the lead vehicle start to brake at the same time, the subject vehicle gradually approaches the lead vehicle. That is, the greater the capacity difference of the two vehicles is, the closer the subject vehicle gets toward the lead vehicle. Therefore, the subject vehicle may need a greater inter-vehicle distance from the lead vehicle.

With regards to the present disclosure, when the lead vehicle's capacity is higher than the subject vehicle, the target inter-vehicle distance is set to have a greater value according to the capacity difference between the lead vehicle and the subject vehicle. Therefore, the target inter-vehicle distance of the subject vehicle is set to have a greater value when the speed control capacity of the subject vehicle is lower in comparison to the lead vehicle.

The above-described advantageous effects are more practically described in the following.

When the vehicles A and C are a passenger vehicle, and the vehicle B is a dump truck, which is heavier than the passenger vehicle, the present disclosure's scheme enables restriction on the maximum deceleration of the vehicle A, for avoiding the approach of the dump truck (i.e., the vehicle B), which has the greater deceleration delay time than the subject vehicle (i.e., vehicle A), toward the vehicle A at the time of same time braking in the convoy travel of those vehicles. Further, for the vehicle C that has the smaller deceleration delay time than the vehicle B, none of the restriction on the maximum deceleration and the setting change of the target inter-vehicle distance (i.e., change from the standard value) is performed, since the vehicle C does not approach the dump truck (i.e., the vehicle B) the time of same time braking in the convoy travel of those vehicles.

As another example, the vehicle A and C are assumed to be a passenger vehicle which is not a sports car, and the vehicle B may be a sports car which has a stronger deceleration magnitude than the passenger vehicle.

In such case, at the time the convoy brakes, the vehicle C is enabled to have a greater target inter-vehicle distance (i.e., a greater-than-standard distance), for avoiding the approach of the sports car (i.e., vehicle B) that has the stronger deceleration magnitude than the subject vehicle (i.e., vehicle C). Further, since the vehicle A that has the weaker deceleration magnitude than the sports car (i.e., the vehicle B) will not approach the sports car (i.e., the vehicle B) at the time of same time braking in the convoy travel of those vehicles, none of the restriction on the maximum deceleration and the setting change of the target inter-vehicle distance (i.e., change from the standard value) is performed for the vehicle A.

Still another example is that, the vehicles A, B, C are all passenger vehicles and only the range sensor 4 of the vehicle B is not detecting the object (i.e., in the sensor lost situation), which is the vehicle A. In such case, at the time of same time braking in the convoy travel of those vehicles, the vehicle A is enabled to restrict its maximum deceleration for avoiding the approach of the vehicle B that has the greater deceleration delay time (i.e., a response time to start to decelerate based on the detection by using the range sensor 4). Further, for the vehicle C that has the smaller deceleration delay time than the vehicle B, none of the restriction on the maximum deceleration and the setting change of the target inter-vehicle distance (i.e., change from the standard value) is performed, since the vehicle C will not approach the vehicle B at such deceleration time in the convoy travel.

Further, in the above embodiment, the restriction on the maximum deceleration may lead to the re-calculation of the speed control capacity by the control unit 12 based on a value of the deceleration, which has been restricted, or may lead to the transmission of the re-calculated capacity to the other vehicle's travel support apparatus 1. In such manner, a process that corresponds to the restricted maximum deceleration (i.e., the first speed control capacity comparison process, the second speed control capacity comparison process, the restricted maximum deceleration value calculation process, and the target inter-vehicle distance calculation process) is performed by the travel support apparatus 1 of the subject vehicle and the travel support apparatus 1 of the other vehicle.

Although the present disclosure has been fully described in connection with the preferred embodiment thereof with reference to the accompanying drawings, it is to be noted that various changes and modifications will become apparent to those skilled in the art.

In the above-mentioned embodiment, the vehicle having the travel support apparatus 1 also has the range sensor 4. However, for example, the vehicle having the travel support apparatus 1 may not have the range sensor 4. In such case, based on the current positions of the lead vehicle and the subject vehicle respectively from the lead vehicle and from the position direction detector 2 in the subject vehicle, the inter-vehicle distance between two vehicle is calculated by the control unit 12 for the detection of such distance, as already described above.

Further, when the vehicle having the travel support apparatus 1 does not have the range sensor 4, such vehicle may calculate the deceleration delay time in the following manner. That is, for example, depending on whether the vehicle is equipped with the range sensor 4, a fixed deceleration delay time may be assigned.

More practically, if the vehicle is "Equipped" with the range sensor 4, the deceleration delay time may be set to 0.4 seconds. Or if the vehicle is "Not-equipped" with the range sensor, or if the vehicle is "Equipped" with the range sensor 4 but the detection by the range sensor is "Detection failed," the deceleration delay time may be set to 1 second. Further, the deceleration delay time calculated in the above-described manner may be increased according to the weight of the vehicle. The vehicle "Not-equipped" with the range sensor 4 may be treated in the same manner as the vehicle with detection result information "Detection failed."

Further, in the above-mentioned embodiment, information about the speed control capacity is exchanged among the travel support apparatuses 1. However, other information such as capacity calculation information may be exchanged among the apparatuses 1 for the same purpose. In such case, the capacity calculation information from the other vehicle is used to calculate the speed control capacity of the other vehicle by the control unit 12. Therefore, the control unit 12 may be provided as a following vehicle speed control capacity calculation unit and a lead vehicle speed control calculation unit in claims. The method of calculating the other vehicle's speed control capacity based on the capacity calculation information from the other vehicle may be same as the method of calculating the subject vehicle's speed control capacity based on the capacity calculation information of the subject vehicle.

Such changes and modifications are to be understood as being within the scope of the, present disclosure as defined by the appended claims.

What is claimed is:

1. A travel support apparatus disposed in a subject vehicle, the apparatus comprising:
    a communication unit for communicably coupling the subject vehicle with surrounding vehicles for exchanging information via vehicle-to-vehicle communication, the information including a speed control capacity of a vehicle;
    a first inter-vehicle distance detection unit for detecting an inter-vehicle distance from the subject vehicle to a lead vehicle of the subject vehicle;
    a travel control unit for controlling the inter-vehicle distance to the lead vehicle based on the information received by the communication unit from the lead vehicle;
    a speed control capacity calculation unit for determining a speed control capacity of the subject vehicle;
    a comparison unit for comparing the speed control capacity of the subject vehicle determined by the speed control capacity calculation unit with the speed control capacity of a following vehicle located behind the subject vehicle when the communication unit receives the speed control capacity of the following vehicle; and
    a maximum deceleration restriction unit for determining a restricted value to restrict a maximum deceleration of the subject vehicle when the comparison unit determines that the following vehicle has a lower speed control capacity than the subject vehicle; wherein
    the speed control capacity of the subject vehicle is determined based on information directly indicating the presence of a range sensor that is equipped to independently detect the presence of a frontal obstacle in front of the subject vehicle and a distance to the frontal obstacle.

2. The travel support apparatus of claim 1 further comprising:
    a target inter-vehicle distance determination unit for determining a target inter-vehicle distance to the lead vehicle, the target inter-vehicle distance having clearance for absorbing an inter-vehicle distance change due to a difference of the speed control capacity of the subject vehicle and the speed control capacity of the lead vehicle after the maximum deceleration restriction unit determines the restricted value of the maximum deceleration of the subject vehicle, wherein
    the travel control unit controls the inter-vehicle distance between the subject vehicle and the lead vehicle to at least the target inter-vehicle distance determined by the target inter-vehicle distance determination unit.

3. The travel support apparatus of claim 1 further comprising:
    a second inter-vehicle distance detection unit for detecting an inter-vehicle distance between the subject vehicle and the following vehicle, wherein
    the maximum deceleration restriction unit determines the restricted value of the maximum deceleration based on the speed control capacity of the following vehicle, the speed control capacity of the subject vehicle, and the inter-vehicle distance between the subject vehicle and the following vehicle detected by the second inter-vehicle distance detection unit.

4. The travel support apparatus of claim 1 further comprising:
    a capacity calculation information acquisition unit for acquiring capacity calculation information from a device installed in the subject vehicle, wherein
    the speed control capacity calculation unit calculates the speed control capacity of the subject vehicle based on the capacity calculation information acquired by the capacity calculation information acquisition unit.

5. The travel support apparatus of claim 4, wherein the communication unit transmits the capacity calculation information acquired by the capacity calculation information acquisition unit.

6. The travel support apparatus of claim 1 further comprising:
    a memory unit for having a speed control capacity of the subject vehicle stored therein, wherein
    the speed control capacity calculation unit retrieves the speed control capacity of the subject vehicle from the memory unit.

7. The travel support apparatus of claim 1, wherein the communication unit transmits the speed control capacity of the subject vehicle to surrounding vehicles via vehicle-to-vehicle communication.

8. The travel support apparatus of claim 1 wherein
    the speed control capacity of the subject vehicle is an indication of a length of time required to reduce a speed of the subject vehicle to a subject vehicle target value; and
    the speed control capacity of the following vehicle is an indication of a length of time required to reduce a speed of the following vehicle to a following vehicle target value.

9. A travel support apparatus disposed in a subject vehicle, the apparatus comprising:
    a communication unit for communicably coupling the subject vehicle with surrounding vehicles for exchanging information via vehicle-to-vehicle communication, information including a convoy information for a convoy travel of multiple vehicles and a speed control capacity of a vehicle transmitting the information;
    an inter-vehicle distance detection unit for detecting an inter-vehicle distance to a lead vehicle;
    a travel control unit for organizing the convoy travel of multiple vehicles by controlling the inter-vehicle distance to the lead vehicle based on the convoy information received by the communication unit;
    a speed control capacity calculation unit for determining a speed control capacity of the subject vehicle;
    a comparison unit for comparing the speed control capacity of the subject vehicle calculated by the subject vehicle speed control capacity calculation unit with a speed control capacity of the lead vehicle located ahead of the subject vehicle received by the communication unit; and
    a target inter-vehicle distance determination unit for determining a target inter-vehicle distance to the lead vehicle, wherein the target inter-vehicle distance is greater when the comparison unit determines the speed control capacity of the lead vehicle is greater than the speed control capacity of the subject vehicle; wherein the speed control capacity of the subject vehicle is determined based on information directly indicating the presence of a range sensor that is equipped to independently detect the presence of a frontal obstacle in front of the subject vehicle and a distance to the frontal obstacle.

10. The travel support apparatus of claim 9 wherein
the speed control capacity of the subject vehicle is an indication of a length of time required to reduce a speed of the subject vehicle to a subject vehicle target value; and
the speed control capacity of the following vehicle is an indication of a length of time required to reduce a speed of the following vehicle to a following vehicle target value.

11. A travel support apparatus disposed in a subject vehicle, the apparatus comprising:
a communication unit for communicably coupling the subject vehicle with surrounding vehicles for exchanging information via vehicle-to-vehicle communication, the information including convoy information for a convoy travel of multiple vehicles and a capacity calculation information for determining a speed control capacity of a vehicle transmitting the information;
a first inter-vehicle distance detection unit for detecting an inter-vehicle distance to a lead vehicle;
a travel control unit for organizing the convoy travel of the multiple vehicles by controlling the inter-vehicle distance to the lead vehicle based on the convoy information received by the communication unit;
a subject vehicle speed control capacity calculation unit for calculating a speed control capacity of the subject vehicle;
a following vehicle speed control capacity calculation unit for calculating a speed control capacity of a following vehicle based on capacity calculation information received by the communication unit from the following vehicle;
a comparison unit for comparing the speed control capacity of the subject vehicle with the speed control capacity of the following vehicle located behind the subject vehicle; and
a maximum deceleration restriction unit for determining a restricted value to restrict a maximum deceleration of the subject vehicle when the comparison unit determines the speed control capacity of the subject vehicle is greater than the speed control capacity of the following vehicle; wherein
the speed control capacity of the subject vehicle is determined based on information directly indicating the presence of a range sensor that is equipped to independently detect the presence of a frontal obstacle in front of the subject vehicle and a distance to the frontal obstacle.

12. The travel support apparatus of claim 11 further comprising:
a lead vehicle speed control capacity calculation unit for calculating a speed control capacity of a lead vehicle based on capacity calculation information received by the communication unit from the lead vehicle; and
a target inter-vehicle distance determination unit for determining a target inter-vehicle distance to the lead vehicle, the target inter-vehicle distance having clearance for absorbing an inter-vehicle distance change due to a difference of the speed control capacity of the subject vehicle and the speed control capacity of the lead vehicle after the maximum deceleration restriction unit determines the restricted value of the maximum deceleration of the subject vehicle, wherein
the travel control unit controls the inter-vehicle distance between the subject vehicle and the lead vehicle to at least the target inter-vehicle distance determined by the target inter-vehicle distance determination unit.

13. The travel support apparatus of claim 11 further comprising:
a second inter-vehicle distance detection unit for detecting the inter-vehicle distance between the subject vehicle and the following vehicle, wherein
the maximum deceleration restriction unit determines the restricted value of the maximum deceleration based on the speed control capacity of the following vehicle, the speed control capacity of the subject vehicle, and the inter-vehicle distance between the subject vehicle and the following vehicle detected by the second inter-vehicle distance detection unit.

14. The travel support apparatus of claim 11 wherein
the speed control capacity of the subject vehicle is an indication of a length of time required to reduce a speed of the subject vehicle to a subject vehicle target value; and
the speed control capacity of the following vehicle is an indication of a length of time required to reduce a speed of the following vehicle to a following vehicle target value.

15. A travel support apparatus disposed in a subject vehicle, the apparatus comprising:
a communication unit for communicably coupling the subject vehicle with surrounding vehicles for exchanging information via vehicle-to-vehicle communication, the information including convoy information for a convoy travel of multiple vehicles and a capacity calculation information for determining a speed control capacity of a vehicle transmitting the information;
an inter-vehicle distance detection unit for detecting an inter-vehicle distance to a lead vehicle;
a travel control unit for organizing the convoy travel of the vehicles by controlling the inter-vehicle distance to the lead vehicle based on the convoy information received by the communication unit;
an-subject vehicle speed control capacity calculation unit for determining a speed control capacity of the subject vehicle;
a lead vehicle speed control capacity calculation unit for determining a speed control capacity of a lead vehicle based on the capacity calculation information received by the communication unit from the lead vehicle;
a comparison unit for comparing the speed control capacity of the subject vehicle with the speed control capacity of the lead vehicle located ahead of the subject vehicle; and
a target inter-vehicle distance determination unit for determining a target inter-vehicle distance to the lead vehicle, the target inter-vehicle distance being increased according to an increase of capacity difference between the subject vehicle and the lead vehicle when the comparison unit determines that the subject vehicle has a lower speed control capacity than the lead vehicle; wherein
the speed control capacity of the subject vehicle is determined based on information directly indicating the presence of a range sensor that is equipped to independently detect the presence of a frontal obstacle in front of the subject vehicle and a distance to the frontal obstacle.

16. The travel support apparatus of claim 15 wherein
the speed control capacity of the subject vehicle is an indication of a length of time required to reduce a speed of the subject vehicle to a subject vehicle target value; and
the speed control capacity of the following vehicle is an indication of a length of time required to reduce a speed of the following vehicle to a following vehicle target value.

17. A travel support system comprising:
a plurality of vehicles;
a travel support apparatus disposed in each of the plurality of vehicles, the travel support apparatus including:
   a communication unit for communicably coupling each of the plurality of vehicles with each other for exchanging information via vehicle-to-vehicle communication, the information including a speed control capacity of a subject vehicle,
   an inter-vehicle distance detection unit for detecting an inter-vehicle distance from the subject vehicle to a lead vehicle of the subject vehicle,
   a travel control unit for controlling the inter-vehicle distance to the lead vehicle based on the information received by the communication unit from the lead vehicle,
   a speed control capacity calculation unit for determining a speed control capacity of the subject vehicle,
   a comparison unit for comparing the speed control capacity of the subject vehicle with the speed control capacity of a following vehicle located behind the subject vehicle when the communication unit receives the speed control capacity of the following vehicle, and
   a maximum deceleration restriction unit for determining a restricted value to restrict a maximum deceleration of the subject vehicle when the comparison unit determines that the following vehicle has a lower speed control capacity than the subject vehicle, and
   a target inter-vehicle distance determination unit for determining a target inter-vehicle distance to the lead vehicle, the target inter-vehicle distance having clearance for absorbing an inter-vehicle distance change due to a difference of the speed control capacity of the subject vehicle and the speed control capacity of the lead vehicle after the maximum deceleration restriction unit determines the restricted value of the maximum deceleration of the subject vehicle, wherein
   the travel control unit controls the inter-vehicle distance between the subject vehicle and the lead vehicle to at least the target inter-vehicle distance determined by the target inter-vehicle distance determination unit; wherein
   the speed control capacity of the subject vehicle is determined based on information directly indicating the presence of a range sensor that is equipped to independently detect the presence of a frontal obstacle in front of the subject vehicle and a distance to the frontal obstacle.

18. The travel support apparatus of claim 17 wherein
the speed control capacity of the subject vehicle is an indication of a length of time required to reduce a speed of the subject vehicle to a subject vehicle target value; and
the speed control capacity of the following vehicle is an indication of a length of time required to reduce a speed of the following vehicle to a following vehicle target value.

* * * * *